United States Patent [19]

Pickering

[11] Patent Number: 5,684,965
[45] Date of Patent: Nov. 4, 1997

[54] AUTOMATED BILLING CONSOLIDATION SYSTEM AND METHOD

[75] Inventor: Richard E. Pickering, New York, N.Y.

[73] Assignee: American Express Travel Related Services, Inc., New York, N.Y.

[21] Appl. No.: 418,842

[22] Filed: Apr. 7, 1995

Related U.S. Application Data

[63] Continuation of Ser. No. 109,424, Aug. 20, 1993, abandoned, which is a continuation of Ser. No. 964,922, Oct. 22, 1992, abandoned.

[51] Int. Cl.[6] .................................................. G06F 15/00
[52] U.S. Cl. ...................... 395/234; 235/37.9; 283/60.1; 395/240; 395/245
[58] Field of Search .................................. 364/401, 406, 364/408, 464.01, 464.04; 235/379, 380, 382.5; 283/57, 58, 59, 60.1, 60.2, 66.1; 395/201, 207, 230, 232, 234, 235, 240, 245

[56] References Cited

U.S. PATENT DOCUMENTS

| | | | |
|---|---|---|---|
| 4,707,592 | 11/1987 | Ware | 235/379 |
| 4,713,761 | 12/1987 | Sharpe et al. | 364/406 |
| 5,025,373 | 6/1991 | Keyser, Jr. et al. | 364/408 |
| 5,191,525 | 3/1993 | LeBrun et al. | 364/419.1 |
| 5,220,501 | 6/1993 | Lawlor et al. | 364/408 |
| 5,223,699 | 6/1993 | Flynn et al. | 235/380 |
| 5,231,569 | 7/1993 | Myatt et al. | 364/408 |
| 5,283,829 | 2/1994 | Anderson | 380/24 |
| 5,357,563 | 10/1994 | Hamilton et al. | 379/91 |
| 5,383,113 | 1/1995 | Kight et al. | 364/401 R |
| 5,483,445 | 1/1996 | Pickering | 364/406 |

OTHER PUBLICATIONS

Pfitzinger; "Consolidate Your Utility Bills"; *The American City;* Aug. 1963; pp. 80–81.

Gardner; "Bank Appoints First Copr. Energy Mgr.; She Sets 15% Cut as Goal"; *Energy User News;* v9; p1(2); Aug. 6, 1984; Dialog: File 148, Acc#02180920.

Manley; "Before You Sign That Lease"; *Harvard Business Review;* May/Jun. 1988; p. 140; Dialog: File 122, Acc#124645.

Nielsen; "Experts Who Can Solve Your Budget Problems"; *Good Housekeeping;* v209 n1; p177(1); Jul. 1989; Dialog: File 47, Acc#03306011.

Wiener; "Supercharging Your Computer With a Phone and Modem: On–line Services"; *US News & World Report;* v107 n20; p90(3); Nov. 20, 1989; Dialog: File 148, Acc#04149335.

Moore; "Utility Deregulation and AMR Technology"; *Public Utilities Fortnightly;* v127 n12; pp. 54–56; Jun. 15, 1991; Dialog: File 485, Acc#00319850.

"Cincom Announces Accounts Payable Module"; Dateline: Cincinnati, OH; Jul. 1985; Dialog: File 621, Acc#103704.

"McCormack & Dodge Adds AP:Millennium to VAX Product Line"; Dateline: Ntick, MA; Oct. 10, 1989; Dialog: File 621, Acc#0243273.

(List continued on next page.)

Primary Examiner—Gail O. Hayes
Assistant Examiner—Stephen R. Tkacs
Attorney, Agent, or Firm—Snell & Wilmer

[57] ABSTRACT

An automated method and system for consolidating a plurality of individual company charges for a customer with different periodic company billing and payment due dates is provided. Under the system, companies and businesses such as utility companies report their periodic billing information to a central processing office or facility. The processing office holds the billing information data in time suspense until all of the billing information for the customer during a pre-selected time period is received. Then, the central processing facility generates a single customer statement which identifies all individual company charges as well as a statement due date. The statement is sent to the customer and payment for the identified charges is due by the statement due date. After receiving payment from the customer, the centralized billing center processes the payment and then remits payment to all of the companies.

5 Claims, 5 Drawing Sheets

OTHER PUBLICATIONS

Fraser, Jill Andresky; "Account–Ability"; *Inc.*; v13 n3; pp.: 72–78; Mar. 1991; ISSN: 0162–8968; Dialog: File 15, Acc#00538528.

"Pacific Bell Tests New Way of Transmitting Phone Bills: EDI"; *Advanced Office Technologies Report;* May 17, 1991; v2 n10; ISSN: 1054–1462; Dialog: File 636, Acc#01110004.

"Economic Realities of 1991 Help Reshape Telecommunications Field, Says Industry Leader"; *PR Newswire;* PG: 1219A3679; Dec. 19, 1991; Dialog: File 648, Acc#11638256.

Schroeder; "Hilton Starts Centralized Commissions"; *Business Travel News*; Mar. 23, 1992; p. 1, ISSN:8750–3670; Dialog #03712922 (file 16).

Rosen; "Amex's Help On Expense Reports Draws Conrail"; *Business Travel News;* Feb. 15, 1993; p. 12, ISSN:8750–3670; Dialog #04306057 (file 16).

Citi–One Telephone Bill Payment Jan., 1992.

Chase Pay By Phone—1991.

Tell Your Money Where To Go—1992.

Smart Phone—Jan. 28, 1991.

Enhanced Telephone—1990.

Direct Access—1989.

BillPay USA—1992.

Wells Fargo Automatic Payment.

Karen Gallo, Bank America, Safeway Joining to Offer Shop–at–Home Service, American Banker, Nov. 27, 1991.

Eben Shapiro, Phones Getting Smarter with Built–In Computer, New York Times, Apr. 17, 1991.

John J. Keller, SmartPhone Has Milestone: First Customer Wall Street Journal, Mar. 19, 1991.

Jeanne Iida, TV Answer, CheckFree in Bill Payment Pact, American Banker, Jun. 12, 1992.

MCI Announces A New Billing Arrangement.

Synergistics Research Corporation, FOCUS Series, Jul., 1992.

Richard Layne, Citibank Is Planning to Launch Phone Banking Service in Mar., American Banker, Oct. 11, 1990.

Karen Gullo, More Companies To Offer Phone Banking Devices, The Los Angeles Times, Aug. 21, 1990.

Karen Gullo, Banks Rush to Develop Home Banking Over Telephones, The Reuter Business Report, Jul. 18, 1990.

Karen Gullo, Bank–by–Phone Competition Rising, American Banker, Jul. 16, 1990.

Karen Gullo, Citicorp Piqued at Vendor as Rival American Banker, Apr. 13, 1990.

Michael Quint, Consumer's World: Bills to Pay? The New York Times, Mar. 3, 1990.

"Norway: TRW Sells Image Processing System to Norwegian Clearing House"; American Banker; Nov. 16, 1988; p. 9; Dialog: File 771, Acc #04509594.

Briere et al.; "Footing the Bill"; Network World; v9n21; pp. 32–34; May 25, 1992; Dialog: File 15, Acc #00616623.

McCord: "How Can You Prevent Collection Woes?"; Ophthalmology Times; Oct. 15, 1992; p. 38; Dialog: File 16, Acc#04132471.

Malm; "Domestic Transfers in Sweden—Efficiency Through Competition and Cooperation (Part 1 o 2)"; Banker International; C/c 8/89; Aug. 1987; Dialog: File 771, Acc #01983919.

"New Electronic Payment System Brings Utility Customers Into 'Checkless Society'"; News Release; Feb. 20, 1990; p. 1; Dialog: File 16, Acc #02504853.

White; "Consumer Bill Paying Services in the Evolving Electronic Funds Transfer Environment"; Magazine of Bank Administration; v53n11; pp. 38–43; Nov. 1977; Dialog: File 15, Acc #00064668.

Hager; "The Swedish Postal Giro and Its Progress"; Journal of Bank Research; v. 16 n4; pp. 227–231; 1986; Dialog: File 15, Acc #00323385.

"Secret Citicorp 'Lab' Pits Technologies Against Real People"; *Wall Street Journal*; Mar. 11, 1988; By Robert Guenther.

"Citicorp Is Testing 'A Small, Portable' Banking Terminal"; *Wall Street Journal*; Apr. 11, 1988; By Daniel Hertzberg.

"BT Tymnet Selected by Prodigy to Provide Nationwide Access"; *Business Wire*; Sep. 6, 1990.

"Honeymoon's Over"; *Wall Street Journal;* Jun. 21, 1990; By Robert Guenther and Douglas R. Sease.

"Prodigy Might Pay the Bills"; *The Business Journal–Charlotte* v5, n21; Sep. 10, 1990; By Erle Norton.

"Cellular One Selects Vax 9000"; Apr. 20, 1990; p. 1; Dialog Acc #02607452.

"Citibank and Chase Introduce Systems For Banking at Home"; *Wall Street Journal;* Dec. 13, 1984.

"Prodigy Goes National"; *PR Newswire;* Sep. 6, 1990.

"IBM–Sears Venture Launches National Service"; *PR Newswire*; Sep. 6, 1990.

"'Audiotex' Market Explodes With Services For Everyone"; *Wall Street Journal*; May 25, 1990.

"Prodigy to Hike Its Rates, Offer More Services"; *Los Angeles Times;* Sep. 6, 1990 By Stuart Silverstein.

"Technology: Citicorp Skips Computer In New Home Banking Plan"; *Wall Street Journal;* Feb. 28, 1990 By Robert Guenther.

"Managing Utility Billing:" Jul./Aug. 1979; pp. 11–13; v7 n4; IBM Corp.

"Personal Transaction Teller (PTT)"; SSI; Jan. 10, 1992; Dialog Acc #02607452.

"New Player in Electronic Bill Paying"; *American Banker*; Jun. 28, 1989, p. 6; Dialog Acc #02223186.

Summary Of Account  *FIG. 4*

PLEASE RETAIN THIS PORTION FOR YOUR FILES.

CUSTOMER NAME: T.H. SAMPLEMAN
REFERENCE NUMBER: 2300-11-23444-44444
PAYMENT DUE DATE: 2-15-92 — 81

| COMPANY ACCOUNT NUMBER<br>CUSTOMER SERVICE NUMBER | SERVICE PERIOD | PREVIOUS BALANCE | AMOUNT PAID | AMOUNT DUE |
|---|---|---|---|---|
| US ELECTRIC COMPANY<br>65-5088-5555-0000-0<br>1-800-555-8695 | 04-05-93<br>05-03-93 | $ 75.43 | $75.43 | $ 76.92 |
| AMERICAN GAS COMPANY<br>03432-41000<br>1-800-555-8245 | 03-13-93<br>05-08-93 | 53.68 | 53.68 | 42.54 |
| CABLE COMPANY<br>25306-125<br>1-800-555-7604 | 06-08-93<br>07-07-93 | 35.00 | 35.00 | 35.00 |
| GENERAL WATER SUPPLY<br>96875-09-3<br>1-800-555-8794 | 04-11-93<br>05-10-93 | 27.06 | 27.06 | 28.30 |
| BELL TELEPHONE COMPANY<br>205 999 1241 845 222<br>1-800-555-2416 | 04-22-93<br>05-22-93 | 43.20 | 29.40 | 63.53 — 75 |
| AT&T<br>205 999 1214 845 222<br>1-800-555-0004 | 04-22-93<br>05-21-93 | 26.85 | 26.85 | 25.42 — 76 |
| TOTAL | | $261.22 | $247.42 | $285.51 |

PLASE PAY THIS AMOUNT

IMPORTANT MESSAGE: PAY — — — — — — — — — — — — —
— — — — — — — — — — — — — — — — — — — — — 77

Statement Of Account

PLEASE ENTER — — — — — —

79

REFERENCE NUMBER: 2300-11-23444-44444
TOTAL AMOUNT DUE: $ 285.51

T.H. SAMPLEMAN
543 MAIN STREET
YOUR TOWN, USA 11201

PROCESSING CENTER
P.O. BOX 1270
FLAGSTAFF, AZ 07101-1270

☐ CHECK HERE — — — — — — — — — — —

5,684,965

AUTOMATED BILLING CONSOLIDATION SYSTEM AND METHOD

This is a continuation of U.S. patent application Ser. No. 08/109,424, filed Aug. 20, 1993, now abandoned, which is a continuation of U.S. patent application Ser. No. 07/964,922, filed Oct. 22, 1992, now abandoned.

BACKGROUND OF THE INVENTION

This invention relates to an automated system for consolidating a plurality of individual charges for a customer, and more particularly, to a method for consolidating a plurality of individual customer charges from a plurality of companies which have different periodic customer billing dates and different payment due dates.

Normally, the customer or consumer receives several if not numerous individual bills or invoices from companies such as utilities during a single month or single time period. However, customer billing dates for several companies and utilities vary. For most utilities, including those which require a meter reading, bills are usually mailed within a day of the individual utility company meter reading. Thus, a consumer or customer's bills are cut, mailed and ultimately due on varying dates during the month or billing cycle.

For many customers, remittance of payment for the charges identified in the bills or invoices is a time consuming and burdensome task. For each remittance payment, the customer must typically fill out the remittance stub, write an individual check to the company or utility for the amount owed, and mail the stub and check to the company or utility in order to meet the payment deadline.

In addition, because monthly or periodic billing cycles for companies and utilities are not synchronized, the task of payment by the customer may not usually be done at a single sitting. Rather, the customer must process and remit payment to the various companies several times during the month or cycle. This of course is an inefficient system for payment remittance.

Moreover, for a customer who pays a large number of company payments during a month or billing cycle, the postage costs to remit payment can add up to a significant dollar amount.

A possible solution to the above problems is to develop a consolidated billing and payment system. This would provide the customer or consumer with a convenient, simple and time saving bill payment method. However, the development of such a system is not easily achieved.

Accordingly, it would be desirable to provide a consolidated billing and payment system for charges to a customer from companies with different periodic billing and payment due dates.

SUMMARY OF THE INVENTION

Generally speaking, in accordance with the invention, an automated method and system for consolidating a plurality of individual company charges for a customer with different periodic company billing and payment due dates is described. Under the system, companies and businesses such as utilities report their periodic billing information to a central processing office or facility. The processing office or facility holds the billing information data in time suspense until all of the billing information for the customer during a pre-selected time period is received. Then, the central processing facility generates a single customer statement which identifies all individual charges as well as a statement due date. The statement is sent to the customer and payment for the identified charges is due by the statement due date. After receiving payment from the customer, the centralized billing facility processes the payment and then remits payment to all of the companies.

Significantly, under the system, all company bills are effectively due for payment at the same time (the common customer billing date). As a result, at least some of the companies may receive payment later than they otherwise would if they handled the billing and remittance themselves. Because of this delay (the "float" period), each of the companies would lose monetary interest based on the time difference between the consolidated statement due date and the individual company payment due date. Accordingly, as part of the system and in order to encourage companies to consider joining the consolidated program, the central processing facility will rebate to each company a compensatory payment for the monetary interest lost due to this time difference in payment dates.

As part of the system, a single periodic customer billing date for the charges incurred by the customer from the selected companies is chosen. This is achieved by analyzing historical customer billing data that is reported to the central processing office by each of the companies and then calculating an optimal single periodic billing date which minimizes the overall compensatory payment that is rebated to companies.

Because a central processing office or facility is used, there may be a further delay in remitting payment to each of the companies after receiving payment from the customer. Consequently, the financial firm which monitors the billing system may also elect to enhance the compensatory payment to the companies in order to compensate for this delay.

Once the system is in place, the central processing facility may evaluate the payment behavior patterns of the customer after receiving customer payments over a given time period. Based on this evaluation, the central processing facility will determine whether the customer is paying more or less promptly than he or she was doing when paying the companies on an individual basis. Depending upon this determination, the central processing facility will periodically adjust the compensatory payment to each of the companies in order to reflect the payment patterns of the customer.

Finally, the central processing facility can generate annual summary statements of individual customer's expenditures for facilitating tax preparation or preparing budgets.

Accordingly, it is an object of this invention to consolidate a plurality of individual company and utility charges for a customer into a single periodic customer invoice or statement.

Still another object of the invention is to provide a consolidated billing system for the payment of utility and company charges which reduce billing costs to the individual companies and businesses.

A further object of the invention is to reduce the time and expense of the customer in transmitting periodic payments of business and company charges.

Still another object of the invention is to provide monthly and yearly summary statements of utility and company expenditures incurred by a customer.

Yet a further object of the invention is to facilitate collection of company and utility charges from a customer.

Still other objects and advantages of the invention will in part be obvious and will in part be apparent from the following specification.

The invention accordingly comprises the several steps and the relation of one or more of these steps with respect to each of the others, and the system embodying the features of construction, combination of elements and arrangement of components which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 4 is a schematic view of a periodic customer statement which is generated in accordance with the system of the present invention.

DETAILED DESCRIPTION

In order to implement the consolidated billing system of the invention, a financial firm or charge card company such as the assignee, American Express Company, sets up a central or regional processing center or facility. As a first step, the financial firm signs up businesses and companies which are interested in participating in the consolidated billing system. As an example, the system may be used for consolidating the billing of utility companies such as the gas company, the electric company, the cable TV company, the telephone company (including long distance and local billing), the water company, the oil company and the sanitation company. Other companies may be added to the system as it expands.

The companies or utilities are notified of the consolidated billing system by the financial firm through a sales force, marketing and/or promotional materials as is well known in the art. If a company such as a utility is interested in participating in the program, an examination is made of the utilities data processing compatibility/data transmission processes and subsequently a link will be developed between the central processing center and the utility.

The next step in setting up the consolidated system is enrolling specific customers. Customers may be sent brochures or utility bill inserts regarding the consolidated billing system in each of their monthly bills from the companies and utilities participating in the program. Alternatively, media advertisements on TV and radio or in the newspapers may be used. If a customer is interested in participating in the program, the customer contacts the financial firm (usually by telephone) and provides information regarding which company or utility bills should be included, as well as personal information such as name, address and social security number. Once this information is processed by the financial firm, the customer is enrolled in the system.

After being enrolled, customer data is input into the central processing computer system. If information or data is missing on a particular customer, either the customer or the utility is contacted in order that a complete set of data may be inputted. As shown in the FIG. 1 flow diagram, once customer data has been fully inputted, central processing notifies the companies and utilities (11) that have been selected by the customer for bill consolidation under the system. The company or utility is also requested to provide a billing and payment history of the customer.

Figure 1:
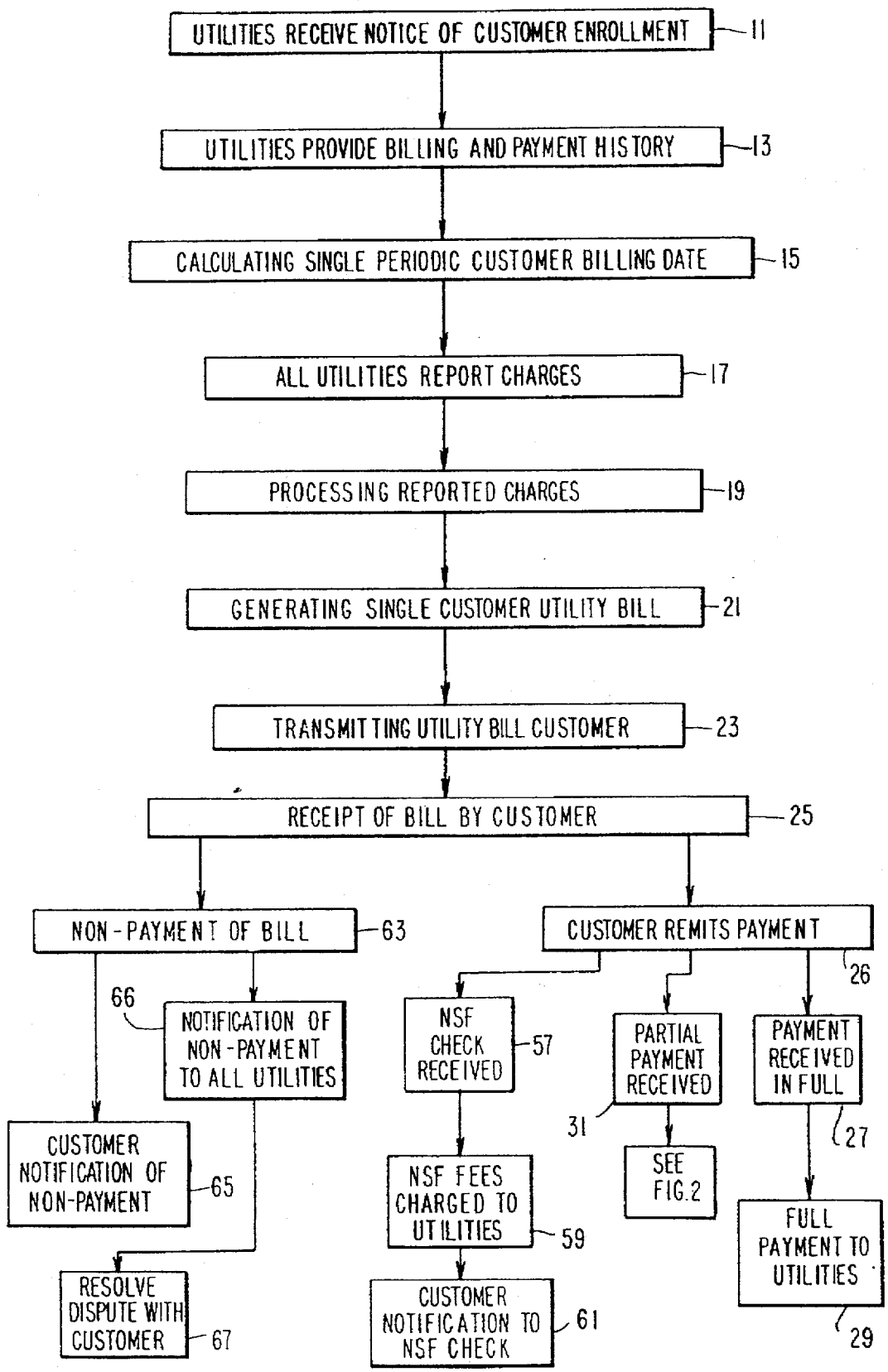
FIG. 1 is a flow diagram representative of the consolidated billing and payment system .of the present invention.

Continuing with the flow diagram of FIG. 1, after receiving the billing and payment histories of the customer from each of the companies and utilities (13), the data therefrom is analyzed via a software program in order to determine an optimal billing date for the customer. In particular, the optimal periodic billing date is calculated (15) utilizing a minimization modeling process as is well known in the art in order to minimize the compensatory payments that will be rebated to the companies and utilities, as discussed hereinafter. The modeling process takes into account the periodic billing and payment due dates of each company and utility for the customer as well as the average dollar value charged by each company and utility during a billing cycle.

Once the optimal billing date is determined, the customer is sent confirmation of participation in the billing system by the financial firm, and is also advised of the new billing cycle based on the optimal billing date that was determined. In addition, the companies and utilities of the customer are also advised of the optimal billing date that will be used for the customer.

Once customer enrollment and account set up have been completed, as described hereinabove, the financial firm can then commence operation of the consolidated billing system for the customer. In particular, and continuing with FIG. 1, once a company-or utility billing cycle is completed, and the customer charge for that company and utility is determined, the company and utility charges are reported to the financial firm (17). This data is retained in storage at central processing until all billing information of the customer is received from the companies and utilities during a billing cycle. Then, the reported charges of the companies and utilities are processed (19) and a single customer billing statement is generated (21). As shown in FIG. 4, the statement identifies each of the companies and utilities: which have rendered charges, the charges for the particular billing cycle, and the total amount due for payment by the customer (77). In addition, the statement (summary of account) may also include the payment status for each utility as well as the charges of the company or utility for previous months. The statement will also include a remittance stub (79) which is selectively detachable from the remainder of the statement along a perforated fold. As discussed in greater detail below, the remittance stub is returned with the customer's payment to the financial firm.

As illustrated on the statement depicted in FIG. 4, the statement also includes a payment due date (81). After the statement is sent to the customer (step 23 in FIG. 1), the customer has until the due date to pay the charge (77) identified on the statement without incurring any penalty. The payment due date is selected based on the date the statement is sent to the customer. Typically, the payment due date on the statement is between 15 and 30 days after the date the statement is transmitted to the customer.

The statement may be transmitted to the customer along with replicated billing information or copies of individual statements or invoices from the companies and utilities. These company and utility statements or invoices may be presented in various types of formats, including a four part (quadrant form) reprint of the bills on a single sheet. In addition, informational and promotional enclosures ("inserts") may also be transmitted along with the customer statement. These and other items which may or may not be enclosed with the customer statement are pre-selected by the customer when the customer signs up with the financial firm to participate in the consolidated billing system. Therefore, if a customer does not want copies of the individual company and utility bills, or the customer does not want copies of non-required informational and promotional inserts, he or she may select to do so.

Figure 5:
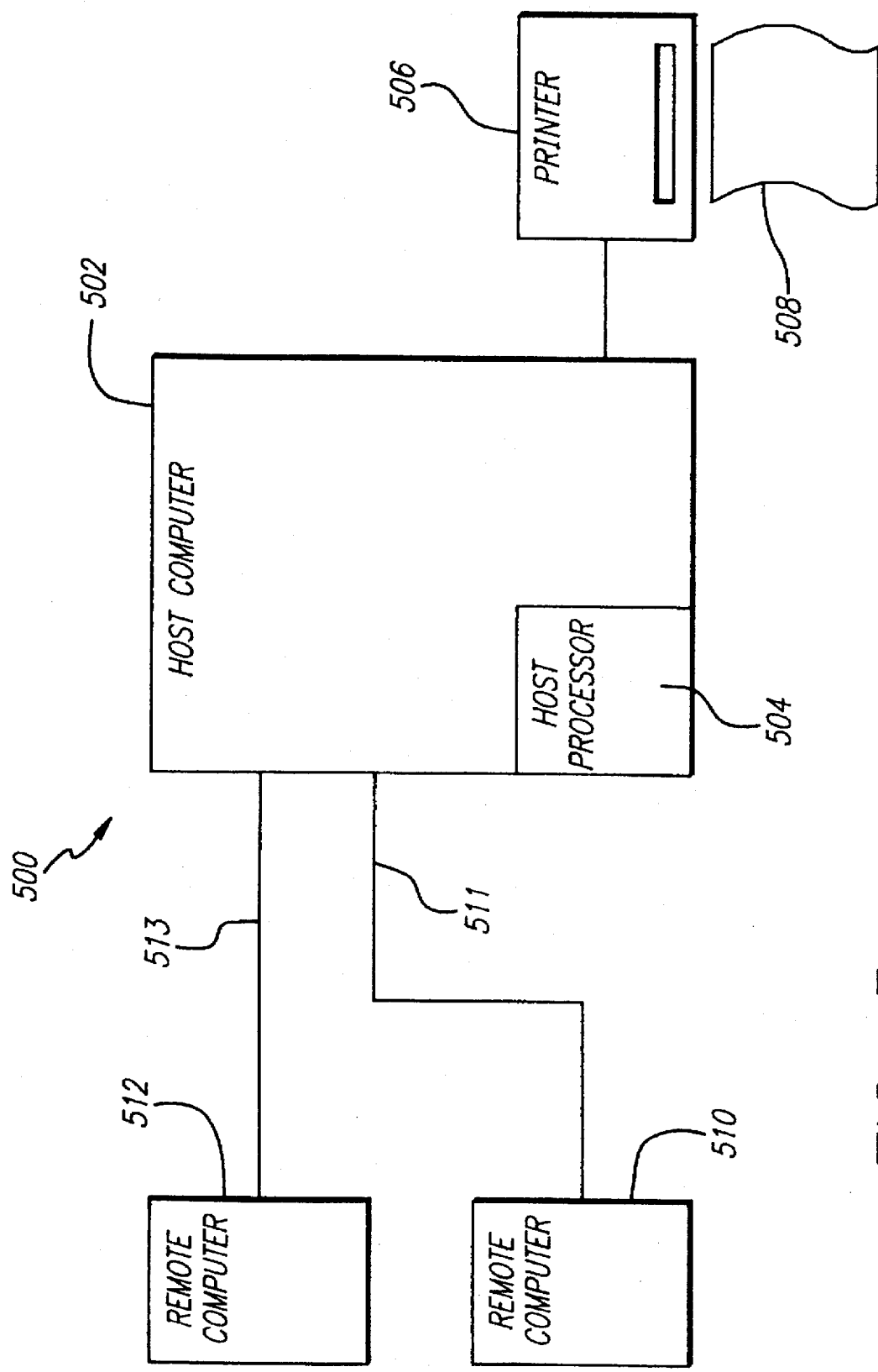
FIG. 5 is a schematic view of a host computer and respective remote computers configured to implement the processes described in FIGS. 1–4.

Referring now to FIG. 5, a computer system 500 in accordance with the present invention suitably comprises a host computer 502 including a host processor 504 and a printer 506, a first remote computer 510 connected to host computer 502 via a first link 511, and a second remote computer 512 connected to host computer 502 via a second link 513. In accordance with one aspect of the present invention and as discussed in greater detail below, respective first and second remote computers 510 and 512 are suitably configured to transmit billing and related information to host computer 502, whereupon host computer suitably 502 causes printer 506 to generate a single integrated bill 508.

Referring again to the FIG. 1 flow diagram, once the customer receives his or her consolidated billing statement (25), the customer has until the payment due date indicated on the statement to remit payment of the charges indicated thereon. When any payment is remitted by a customer (26), it must then be determined if full or partial payment has been received. If the customer remits full payment (or for that matter partial payment) to the financial firm in order to meet the payment due date (27), the financial firm processes the payment (and the enclosed stub). The payment (typically a check) is deposited into a financial bank and the financial firm may wait for clearance of the funds from the bank identified on the customer's check. Alternatively, the financial firm may transfer deposits via automatic clearing house (ACH) transfers or other means prior to the funds being cleared. If the funds are cleared, the funds could be transmitted by electronic mail or via check or other means to the various companies and utilities (29).

Simultaneously, when full payment is received, the utilities are notified and the customer's account with the companies and utilities is noted as paid.

Figure 2:
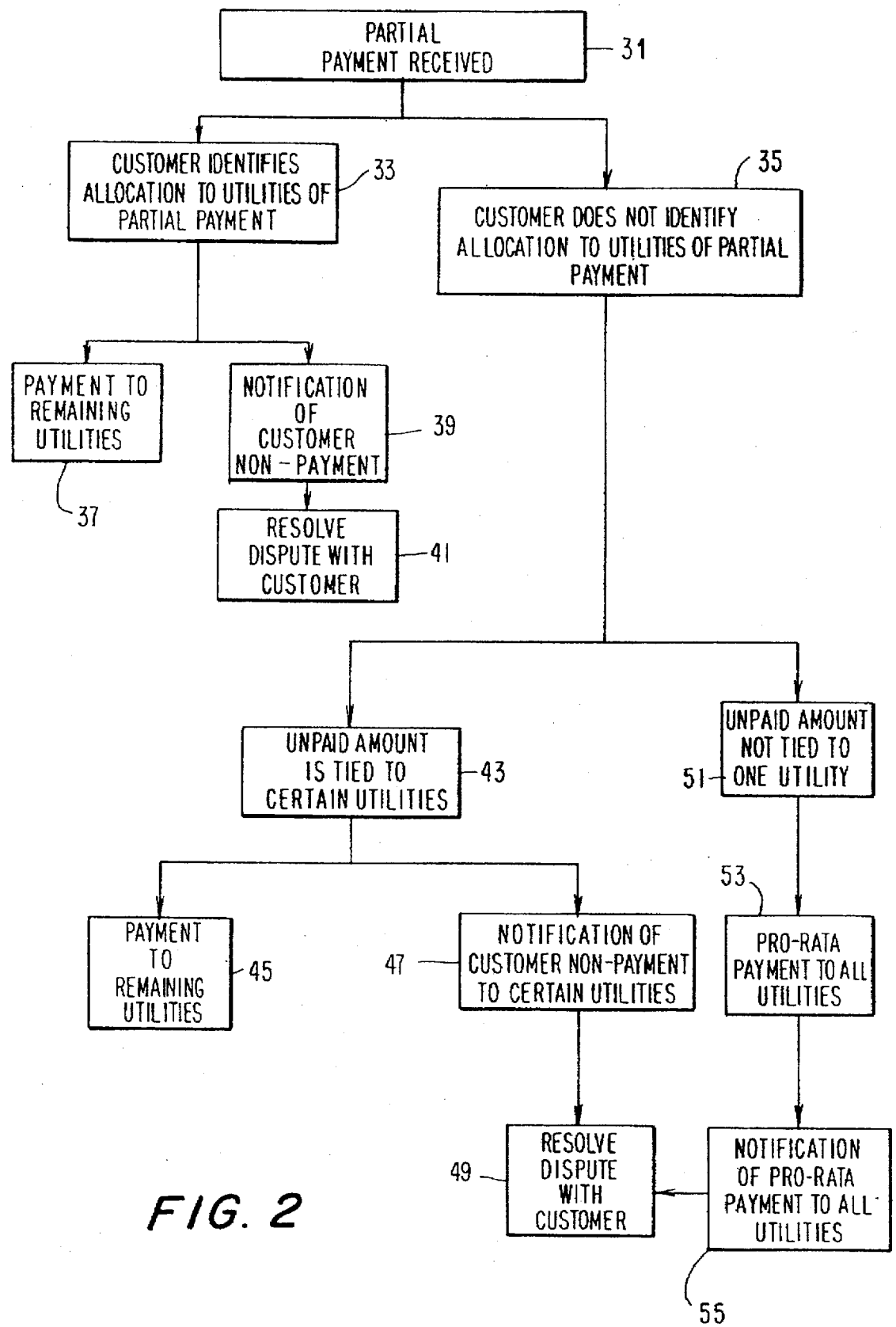
FIG. 2 is a flow diagram which branches from FIG. 1 and which is representative of the partial payment portion of the consolidated billing system in accordance with the present invention.

In some situations, the customer will only remit a partial payment of the charges reflected in the customer statement by the payment due date (31). In this situation, as illustrated in the flow diagram of FIG. 2, there are two possibilities: (i) the customer has identified allocation of partial payment to the utilities (33), or (ii) the customer has not identified allocation of his or her partial payment (35). In the situation where the customer has identified allocation of payment, the utilities which are designated for payment are sent notification via ACH or other means (37) and the customer's account at the companies and utilities is credited appropriately. With respect to those utilities which are not designated for payment, or which have only been partially paid, the utility receives notification of non-payment or partial payment (39). In addition, the customer may receive notification from either the financial firm or the utility and other companies. Furthermore, customer service system (41) may be used in order to resolve the billing dispute with the customer.

In some situations, the customer will remit only partial payment (see FIG. 2), but does not identify the allocation of that payment to the companies and utilities (35). If the non-payment can be tied to certain utilities (43), then those companies and utilities which are to be paid receive funds (45) in the manner described above. A clear example where non-payment of a portion of the statement can be tied to a particular utility can easily be demonstrated in conjunction with the dollar values shown on the summary of account in FIG. 4. If we assume that the customer submits payment in the amount of $153.78, which is $18.41 less than the $172.19 total due, it can be assumed that the customer withheld the $18.41 billed (76) from the American Gas Company. With respect to those companies and utilities for which there is either partial payment or non-payment, the utility receives notification (47) and the company or utility may utilize customer service in order to resolve the billing dispute (49).

Still referring to FIG. 4, if the customer instead remits $158.39, which is $13.80 less than the $172.19 total due, it can be assumed that the customer withheld the Part Due amount (78) of $13.80 that was owed for payment of the previous month's Bell Telephone Company charge. In this instance, it is clear that customer intends to pay all current charges, but disputes a past charge.

If the paid or unpaid amount cannot be tied to any particular company or utility (51), then the financial firm will remit to all the companies and utilities a pro-rata payment (53) based on the partial payment. Simultaneously, all companies and utilities are notified of the pro-rata payment (55) after which customer service may be used in order to resolve the billing dispute (49).

In certain situations and continuing with FIG. 1, the customer will remit payment to the financial firm by check for either the full or a partial amount, but the check will not receive clearance from the customer's bank (57). This situation is known as receipt of an NSF (non-sufficient funds) check. In this situation, the NSF charge incurred by the financial firm is passed onto the companies and utilities (59) or onto the customer. Depending upon how the system is managed, the financial firm may attempt to redeposit the check to see if sufficient funds have been placed in the bank. If the check comes back NSF again, a second fee is charged to the companies and utilities by the financial firm; moreover, the financial firm will now charge the companies and utilities the cost of NSF customer notification (59). The customer may be sent the NSF check either by the financial firm or the company/utility with a notation that an NSF fee has been charged to its account (61).

In the situation where the customer does not transmit any payment to the financial firm (63), the companies and utilities are notified (65). The companies and utilities may then attempt to resolve the dispute or problem with the customer using customer service (67).

As discussed above, using the consolidated billing system, all bills are due for payment by a single statement due date. However, because the billing cycles of individual companies vary (are not synchronized), at least some of the companies and utilities are scheduled to receive payment at a date later than they otherwise would if the company or utility billed the customer individually.

For example, assuming a 30 day month, customer A is billed by three different utilities on a monthly basis as follows:

| UTILITY | BILLING DATE | PAYMENT DUE DATE | BILLING CYCLE |
|---------|--------------|------------------|---------------|
| Electric | 5th of first month | 25th of first month | 30 days |
| Water | 2nd of first month | 22nd of first month | 20 days |
| Gas | 10th of first month | 10th of second month | 30 days |

As the above chart reveals, these companies or utilities have varying billing and payment cycles.

In accordance with the inventive consolidated billing system, a single periodic customer billing date is selected. For the above example, let us presume that the selected single periodic statement billing date is the 10th day of the first month and that the payment due date reflected on the consolidated statement is the 25th day of the first month (a 15 day billing cycle under the inventive system). Therefore, for the water company; it would receive payment later than it would otherwise if it was handling the billing and remittance itself. Due to this extended period ("float"), the water company would be losing monetary interest if it "signed up" with the consolidating billing system. Specifically, the water company would be losing monetary interest between the 22nd of the first month and the 25th of the first month (3 days).

Therefore, in accordance with the inventive consolidated billing system, the financial firm rebates a payment to the water company for the monetary interest lost due to the 3 day "float" period.

With respect to the gas company charge, since the gas company charge would not be due for payment to the gas company until the 10th of the second month, a date after the single periodic statement due date (25th day of the first month), a "float" or interest payment may instead be due by the gas company to the financial firm. This is because the gas company would be receiving payment earlier than it Would otherwise receive payment if it handled the billing and remittance itself. In particular, the gas company would be gaining monetary interest between the 25th day of the first month and the 10th day of the second month (15 days).

Therefore, in accordance with the inventive consolidated billing system, the gas company may be charged a payment by the financial firm for the monetary interest gained during its float period. In a preferred method for carrying out the system, the charge is assessed to the gas company by deducting the charge from the amount paid by the financial firm to the gas company.

Finally, with respect to the electric company, no rebate or charge is required since the consolidated statement payment due date under the system is the same as the payment due date of the electric company if it handled billing and remittance itself.

Figure 3:
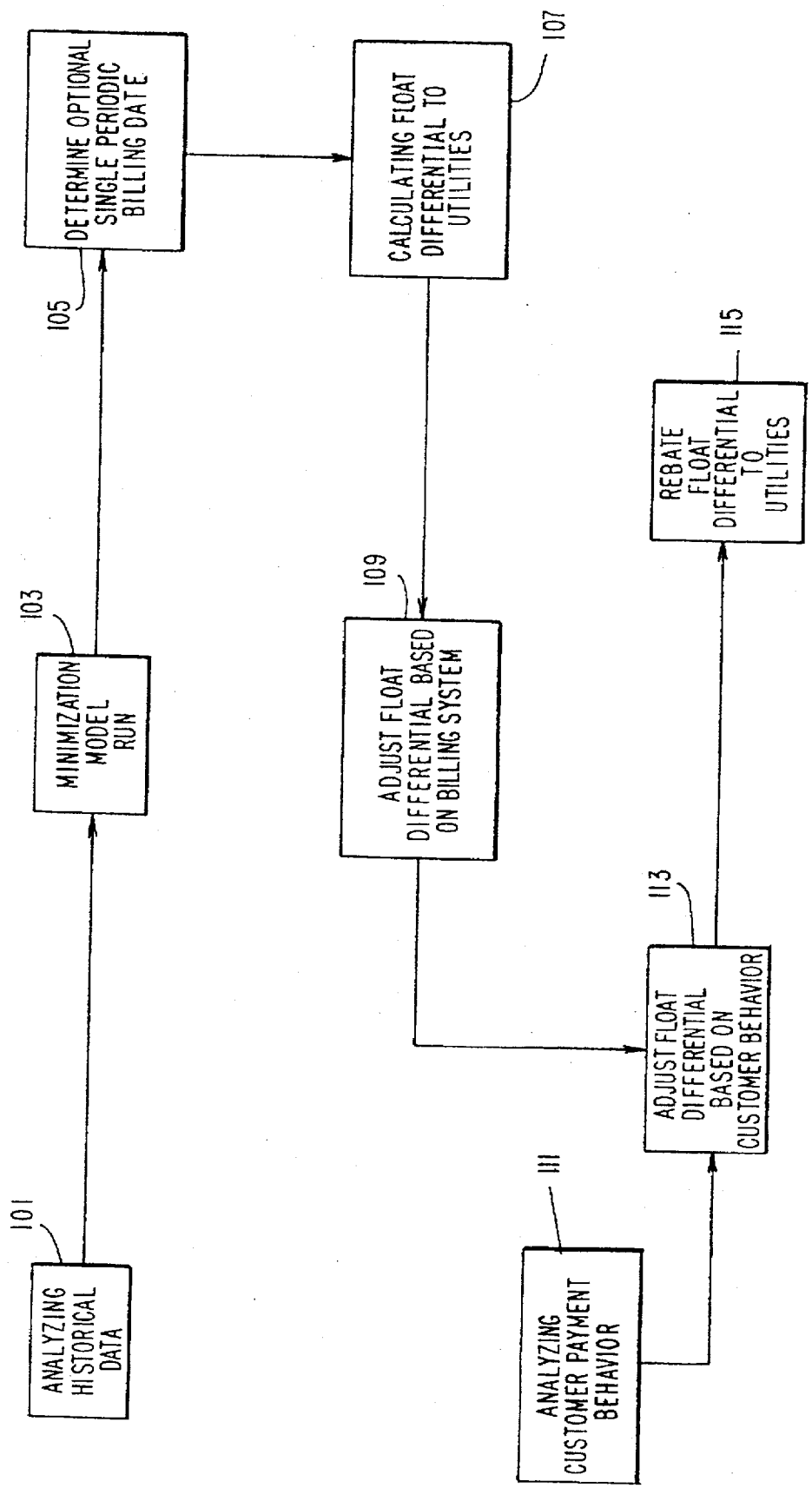
FIG. 3 is a flow diagram representing the rebate portion of the consolidated billing system of the present invention.

As discussed above, and with reference to the flow diagram of FIG. 3, it is preferable to determine or calculate the single periodic customer billing date for the company and utility charges that are incurred by the customer in order to minimize the overall compensatory payment or "float" payment rebated to the group of companies and utilities. This is achieved by analyzing historical customer billing data (101) that is initially supplied by the utilities to the financial firm. Specific factors which are evaluated include the number of days between periodic customer billings by the utilities, the average charges of each of the utilities to the customer and the frequency of billings to the customer by individual utilities. A standard minimization analysis is then performed (103), as is known to one of ordinary skill in the art, which considers one or more of the factors.

Based on the results of the minimization analysis or run, the financial firm determines an optimal single periodic customer billing date (105). A payment due date is then chosen, which is a fixed time period in the billing cycle after the billing date. Once the due date is selected (printed on the consolidated statement depicted in FIG. 4), the financial firm can then calculate the differential interest payment (107) payable each cycle to the utilities, as discussed before.

As described before, the companies and utilities are rebated a compensatory payment ("float" payment) for the monetary interest lost due to the time difference between the statement due date and the periodic customer payment due dates of the individual utilities (115). Under the inventive system, the compensatory payment or "float" payment to the companies may be enhanced by the financial firm to compensate for the additional time required for processing periodic billing information from the utility charges reported by the utilities and processing payments received from the customer (109).

In particular, since the bill consolidating system of the invention utilizes a central (or a regional) processing center or facility, the time between transmitting the single customer billing statement and receipt of the statement by the customer may be longer than if these steps were done by the local company or utility individually. Similarly, the time between remittance of payment from the customer and the time the utility has received the funds from the central or regional financial processing center may be longer than if the company or utility acted on its own. Therefore, the financial firm may elect to enhance the financial rebate to the companies and utilities in order to compensate them for the monetary interest lost due to the additional time needed to receive available funds based on customer remittance of payment. If instead a compensatory payment is owed to the financial firm, the charge assessed the company or utility is reduced appropriately.

Moreover, once the consolidated billing system is in place for a particular customer, the financial firm may periodically monitor and evaluate the payment behavior patterns of the customer (111). In some instances, it may be determined that on average a customer pays more promptly because of receipt of a single periodic customer utility statement than if he or she received different periodic customer billing statements from the individual utilities. This is because the customer is required to spend far less time and effort in order to remit payment of periodic company bills.

Conversely, the opposite may be true, and the behavior pattern of the customer may indicate a tendency on average to remit payment later when he or she receives a single periodic customer utility statement as compared to receipt of different periodic customer billing statements from individual utilities. Since the charge of the consolidated statement is significantly larger than individual company charges, the customer may wait until the very last day on which to remit payment in order to maximize interest earned in his or her bank account.

Depending on the results of this evaluation, the compensatory ("float") payment to each of the companies and utilities may be selectively and periodically adjusted in response to customer behavior patterns (113) and based on negotiations between the various utilities and the financial firm.

In particular, if the customer pays more promptly, any compensatory payment due to the companies or utilities may be decreased. Alternatively, in the same situation, any payment owed to the financial firm may be enhanced.

On the other hand, if the customer pays less promptly, any compensatory payment due to the companies may be increased. Moreover, in the same situation, any payment owed to the financial firm may be reduced.

As discussed hereinbefore, use of the consolidated billing system of the invention is advantageous to the customer, the individual utilities and the financial firm implementing the consolidated billing system. For the customer, instead of receiving several different periodic customer billing statements, the customer receives only a single consolidated statement over a given cycle period. The single statement is more manageable and provides summary information not available to customers by any other type of billing system. In addition, from a financial standpoint, only a single stamp is required to be used by the customer to remit payment for all of his or her utility charges, instead of the several stamps that are usually required for individual utility payments. Furthermore, only a single check or money order is required, further reducing the expense to the customer as well as increasing customer convenience. Another advantage which may be offered to individual customers is the ability to change a mailing address or shut off utility services on a particular date by making a single phone call to the financial firm which would then handle such matters.

Individual utilities will also save money by enrolling in the bill consolidating system of the invention. Current costs for mailing a bill or statement are presently averaged to be about 45¢. This includes variable expenses for postage, materials, handling and processing. Moreover, the cost for remittance processing is estimated at present to be about 18¢ per billing. This cost includes variable expenses for bill opening, statement and stub matching, handling and sorting. By using the consolidated billing system of the invention, the financial firm can provide the same bill mailing service for an estimated 30¢ per bill and the same remittance service for an estimated 6¢ per household bill. This represents a significant savings to the individual utilities. It also frees the utilities to concentrate on servicing the customer. In short, there is both financial and practical savings to the individual utility. Moreover, any reluctance on the part of utilities based on a delay in receiving their funds is eliminated by the rebate aspect of the present invention.

The consolidated billing system benefits the financial firm as well since it will create a source of income by charging the utilities a fee which will earn them a profit while still providing a cost savings to the utilities which will reduce the need to engage in billing matters. The financial firm already has appropriate billing procedures and personnel in place to handle billing and payment matters.

Although it is possible to implement the consolidated billing system of the present invention through manual calculating and bill generating functions, as alluded to above in connection with the running of a minimization program, the system is best implemented by means of computer technology. Data such as historical customer billing data and periodic billing information reported by each of the utilities is forwarded to the central processing office or facility by means of electronic transmissions or periodically supplied data discs, tapes or other means. Software programs are run by a central processing unit (CPU) of the financial firm to perform various mathematical calculations, such as determining a single periodic customer billing date and calculating rebates to each utility. The equations for such calculations and the various hardware CPU's and memory devices which can be implemented are well known in the art.

Based upon evolving customer payment patterns, processing turnarounds, etc., the computer hardware runs the same software programs to periodically update customer billing dates, statement due dates, etc. The data gathered by the financial firm optionally may be used to establish budget payments by the customers based on past utility uses. For instance, in a very simplified example such as a levelized payment plan, if a customer's electric bill equals $30 per month for each of the first six months of the year and $90 per month for the last six months of the year, the financial firm can implement a budget payment plan wherein the customer remits a $60 payment each month. Upward or downward adjustments can be made annually to balance the individual account.

It will thus be seen that the objects set forth above, among those made apparent from the preceding description, are efficiently attained and, since certain changes may be made in carrying out the above process and in the system set forth without departing from the spirit and scope of the invention, it is intended that all matter contained in the description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A computer system for consolidating a plurality of bills into a single integrated bill for subsequent payment by a consumer, comprising:

a host computer including a host processor;

a first remote computer, disposed at a first site, configured to transmit a first data packet over a first link to said host computer; and a second remote computer, disposed at a site remote from said first site, configured to transmit a second data packet over a second link to said host computer, wherein:

said first data packet comprises indicia of the identity of a first entity utilizing said first computer and a first billed amount associated with a first billing cycle and a first payment date;

said second data packet comprises indicia of the identity of a second entity utilizing said second computer and a second billed amount associated with a second billing cycle, which is not synchronized with said first billing cycle, and a second payment date;

said first and second remote computers are configured to independently effect transmission of said first and second data packets, respectively, to said host computer;

said host processor is configured to receive said first data packet from said first remote computer and said second data packet from said second remote computer, and to consolidate said first and second data packets into a single integrated bill for subsequent payment by a consumer;

said host processor is further configured to produce a human-readable copy of said bill, said copy comprising indicia of said first and second entity identities, said first and second billing cycles, said first and second billed amounts, and a single payment date upon which said single bill is due to be paid by said consumer; and said host processor is configured to compute said single payment date as an optimum payment date as a function of said first payment date associated with said first billed amount and said second payment date associated with said second billed amount.

2. The system of claim 1, wherein said host computer further comprises a printer and said human-readable copy of said single bill comprises:

- a first document upon which indicia of said first data packet is printed; and
- a second document upon which indicia of said second data packet is printed.

3. The system of claim 1, wherein said host processor further comprises a printer and is further configured to compute an integrated total and to print said integrated total on said human-readable copy of said single bill, said integrated total being a function of said first payment date, said first billed amount, said second payment date, and said second billed amount.

4. The system of claim 1, wherein said host computer further comprises a printer and said human-readable copy of said single bill comprises a single document, including:

- a first sector within which indicia of said first data packet is printed; and
- a second sector within which indicia of said second data packet is printed.

5. The system of claim 1, wherein said function which relates said optimum payment date to said first and second payment dates comprises said optimum payment date being subsequent to at least one of said first payment date and said second payment date.

* * * * *

Disclaimer

5,684,965—Richard E. Pickering, New York, N.Y. AUTOMATED BILLING CONSOLIDATION SYSTEM AND METHOD. Patent dated Nov. 4, 1997. Disclaimer filed September 22, 2006, by the assignee, American Express Travel Related Services, Company, Inc.

The term of this patent shall not extend beyond the expiration date of Pat. No. 5,483,445.

*(Official Gazette May 22, 2007)*